(12) United States Patent
Starr

(10) Patent No.: US 6,678,627 B1
(45) Date of Patent: Jan. 13, 2004

(54) COMPUTER PROGRAM AND METHOD FOR DETERMINATION OF ELECTRONIC CIRCUIT CARD PRODUCT LIFE CAPABILITY UNDER EXPOSURE TO VIBRATION

(76) Inventor: John E. Starr, 3450 Fernbrook La. North, Plymouth, MN (US) 55447

( * ) Notice: Subject to any disclaimer, the term of this patent is extended or adjusted under 35 U.S.C. 154(b) by 291 days.

(21) Appl. No.: 09/918,180

(22) Filed: Jul. 30, 2001

Related U.S. Application Data

(60) Provisional application No. 60/223,384, filed on Aug. 7, 2000.

(51) Int. Cl.$^7$ .................................................. G01L 1/24
(52) U.S. Cl. ...................................................... 702/119
(58) Field of Search ........................ 702/119; 356/35.5; 73/804, 578, 571; 324/760; 700/286

(56) References Cited

U.S. PATENT DOCUMENTS

| | | | |
|---|---|---|---|
| 5,438,402 A | * 8/1995 | Gupta | 356/35.5 |
| 5,675,098 A | 10/1997 | Hobbs | 73/865.6 |
| 5,744,975 A | 4/1998 | Notohardjono | 324/760 |
| 5,847,259 A | 12/1998 | Hu | 73/1.01 |
| 5,965,816 A | 10/1999 | Hu | 73/578 |
| 6,035,715 A | 3/2000 | Porter | 73/571 |
| 6,301,970 B1 | * 10/2001 | Biggs et al. | 73/804 |

OTHER PUBLICATIONS

Reference 1, 1992, Hobbs; Highly Accelerated Life Test—Halt.
Reference 2, 1992, Hobbs; Highly Accelerated Stress Screens–Hass.
Reference 3, 1999, Starr, Understanding Electronic System Vibration Life Capabilities.

* cited by examiner

*Primary Examiner*—John Barlow
*Assistant Examiner*—Tung Lau

(57) ABSTRACT

An application program and method for determining the fatigue life of electronic products exposed to vibration, including application program steps of (i) describing the mechanical configuration of the electronic product; (ii) describing the vibration profiles representing environmental exposure; (iii) calculating natural response modes of the circuit card; (iv) calculating stress functions for each component, each response mode; (v) calculating normalized fatigue damage of each component; (vi) removing computer calculation error by comparing the normalized fatigue damage for all components to the expectations; (vii) expectations numerically defined by performing equivalent analyses on test experience results; (viii) for the case of accelerated life testing, using the expectations to determine the adequacy of the design or for the case of product reliability testing, using the expectations to determine the effectiveness of the environmental screen; (ix) for the case of design development, repeating previous steps on design concepts to obtain design configurations capable of meeting design goals.

7 Claims, 1 Drawing Sheet

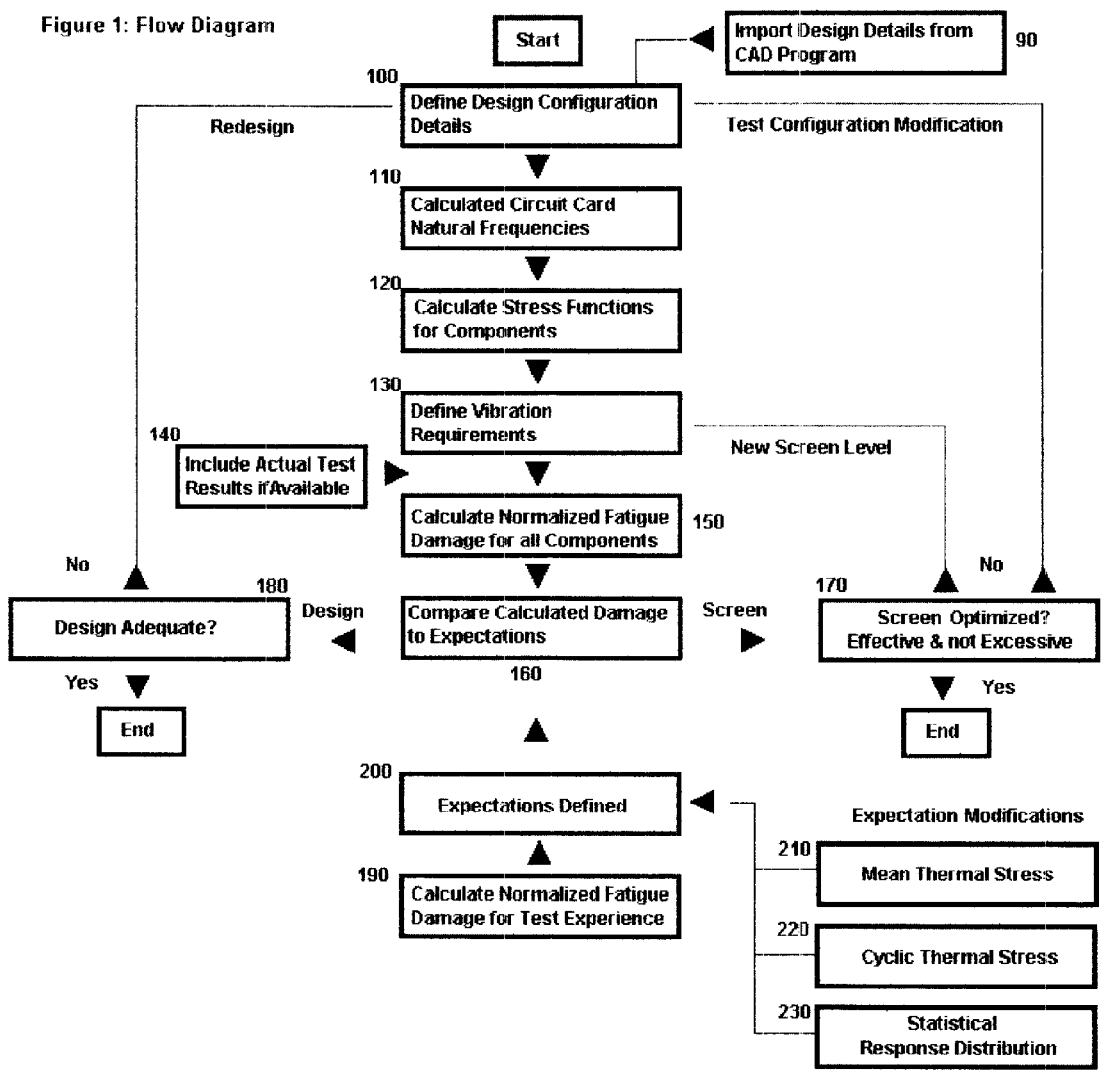
Figure 1: Flow Diagram

COMPUTER PROGRAM AND METHOD FOR DETERMINATION OF ELECTRONIC CIRCUIT CARD PRODUCT LIFE CAPABILITY UNDER EXPOSURE TO VIBRATION

CROSS-REFERENCE TO RELATED APPLICATION

This application is entitled to the benefit of Provisional Patent Application No. 60/223,384, filing date Aug. 7, 2000.

FEDERALLY SPONSORED RESEARCH

Not Applicable.

BACKGROUND

1. Field of the Invention

The field of the invention relates to use of computer methods for validating the operational durability of an electronic circuit card product, composed of or containing one or more circuit card assemblies, based upon physics-of-failure analysis and fatigue damage correlation of accelerated laboratory vibration tests.

BACKGROUND

2. Discussion of Prior Art

During its design life, an electronic product can be exposed to a wide variety of vibration and shock environments. Stress screening is a process used for verification of production quality, in which systems are subjected to environmental load conditions. Vibration in stress screening processes is a very effective means of production quality verification. In order to reduce testing time and cost, laboratory tests are usually conducted on products in a time-accelerated manner. Testing programs have been historically supported by detailed analysis using finite element programs. Electronic systems are very complex structures with characteristics that make accurate predictive analysis nearly impossible.

Prior art methods of determining the adequacy of electronic designs have included the use of extensive test programs, sometimes supported by detailed finite element analysis. When failure occurs under vibration, the failure is a fatigue failure of one or more components of the system. Fatigue is a mechanical failure that occurs in materials that are cyclically loaded, usually occurring as a result of the growth of a crack in the material under repeated load reversals. A wide distribution of life capabilities can be expected when electronic systems are vibration tested to failure. Due to variations in so many contributing factors including material properties and dimensional tolerances, testing programs to fully understand product capabilities must be very extensive. Since a test only provides pass or fail information, testing must be extensive since it must be capable of finding all of the possible failure parts of the system. Since parts typically vary significantly in the parameters that effect failure rate, the defined test procedure must include variations that accommodate the expected variations in properties of critical parts. Historically, test programs have often failed to provide information critical to understanding the vibration life of the product.

Application of conventional detailed finite element analysis can aid in the knowledge gained in these testing programs. But detailed analysis is also very time consuming and expensive. There are wide variations in properties (material and dimensional) that effect life capabilities. Often, detailed analysis is thought to be accurate beyond its actual capability for the variations typical in electronic systems. Detailed analysis for vibration fatigue of electronic systems with predictive methods has very high error rates.

Testing with or without detailed finite element analysis support can be concluded based on budget considerations without an adequate understanding of the product's real-life capabilities.

Prior art includes:
'Test only' methods
'Detailed analysis only' methods
Combined test/analysis methods 'Test only' methods suffer from lack of detailed information on all parts and don't define the risk for all possible failures. References 1 and 2, U.S. Pat Nos. 567,098 and 5,744,975, are examples where test only methods might be used. These test methods can be enhanced when supported by detailed analysis. U.S. Pat. Nos. 5,847,259 and 596,816 specifically include analysis of test results, but these analyses emphasize the statistical analysis of results of tests on many samples, not detailed analysis of the product being tested to understand the failure at the root cause level. U.S. Pat. No. 6,035,715 is an example of using test methods in a trial and error basis, using tests to cause repeated failures to increase capabilities by redesign to eliminate the weakest links.

Analysis only methods suffer from high error that is inherent in the parts used in electronic systems, but do provide information for all parts. However, the accuracy of the analysis for each part is unknown and creating analysis with an adequate margin to cover all error may be too conservative of a method in order to meet design requirements. Combined test and analysis methods are the best means of obtaining an understanding of the electronic system, but prior art analysis methods were extremely expensive and the analysis methods required expertise not available at all organizations in development of electronic systems.

In order to develop a reliable product using prior art methods, designs had to be developed with margins capable of extrapolating test/analysis results to cover configuration variations and inherent modeling error.

OBJECTS AND ADVANTAGES

The primary objective of the computer program and method presented is to understand the effects of vibration on electronic products. Electronic products are exposed to vibration as part of normal life cycle conditions. Vibration is also used in qualification and reliability test procedures.

An additional objective is to determine a numerical definition of fatigue damage at component level based on the physics-of-failure and damage equivalence such that the vibration damage generated in any test condition can be compared to all other combinations of conditions. A method of removing computational error associated with the complex field of vibration life of electronics is used so that the associated analysis yields product understanding. Methods provide a numerical definition of damage at component part level that benefits from all previous experience, not just from designs of similar configuration or vibration excitation level. Comparison of component level damage determines if a component is at risk of failure for a defined requirement, or if it is effectively screened under environmental testing programs. The method uses the benefits of the circuit card's natural shock and vibration modal isolation that protects most of the component parts.

The prior art method of 'test only' is very expensive and suffers from a lack of detailed information. The prior art methods using 'analysis only' require a high level of expertise, are very expensive, and lack accuracy due to high error inherent in electronic system designs. Prior art for combined test and analysis methods require a high level of expertise primarily due to the mathematical modeling in the analysis. The combined methods are very expensive and the prior art analysis methods suffer from a high level of inaccuracy.

The present invention analysis methods are greatly simplified, with lower requirements on level of expertise. The methods provide the capability of performing analysis in support of test programs with removal of error typical in analysis of electronic systems. The methods are efficient, resulting in lower costs of the combined test and analysis programs.

The one sure method of defining capabilities is testing a product to failure. This defines a product's limits, but detailed analysis is required to provide a numerical definition to the product at point-of-failure level. The present invention provides product understanding efficiently and accurately.

SUMMARY

The present invention relates to a computer program and method for validating the operational durability of an electronic product based upon physics-of-failure analysis and fatigue damage correlation of accelerated laboratory vibration tests.

The application program and method for determining the fatigue life fraction used during vibration testing of an electronic product, includes the application program steps of (i) describing the configuration of the electronic product including layout with card geometry, component location with pin attachment points and by entering structural properties and support conditions;

(ii) describing the vibration exposure including sine dwells, sine sweeps and/or random vibration profiles representing environmental exposure for either accelerated life profiles or environmental screening profiles;

(iii) a program means for calculating natural response modes of the circuit card including natural frequency and mode shape;

(iv) a program means for calculating the stress functions for each component and response mode, including stresses from inertial loading and forced modal displacement;

(v) a program means for calculating the normalized fatigue damage of each component by integrating the ratio of 'the number of experienced cycles of exposure at a stress peak' to 'the number of cycles to failure at that stress peak' over the full stress response range for all defined vibration requirements;

(vi) removing computer calculation error by comparing the normalized fatigue damage for all components to the expectations of capability based on component type and component quality;

(vii) for the case of accelerated life testing using the expectations ratio to determine the adequacy of the design, or in the case of product reliability testing using the expectations ratio to determine the effectiveness of the environmental screen;

(viii) a program means for entering actual test response levels;

(ix) a program means for defining the expectations of components by detailed "normalized" analysis of actual tests to failure.

DRAWINGS

Other objects, features and advantages of the invention will be apparent from a study of the written descriptions and drawings in which:

FIG. 1 illustrates a flow diagram for a computer program for use in design or environmental stress screening in accordance with the present invention.

DETAILED DESCRIPTION

When electronic systems are exposed to vibration, natural vibration modes are excited in which the measured response amplitude of vibration exceeds the amplitude of excitation levels. At these frequencies the transmissibility, which is defined as the peak measured response divided by the input level, is greater than 1. Stresses developed under vibration are higher at these natural response modes and can result in fatigue damage of the hardware. An application program and method provides a means of numerically defining the fatigue damage, the method removes the error associated with detailed analysis of electronic systems.

Calculation detail includes:

Fatigue damage under vibration can be estimated using Miner's rule:

$$\sum_i \frac{n_i(S_A)}{N_i(S_A)} \qquad \text{Equ. 1}$$

where $n(S_A)$ is the number of cycles experienced at response stress amplitude level of $S_A$, and $N(S_A)$ is the mean cycles to failure at the applied stress $S_A$. If all error is removed, the summation of the ratio of experienced cycles at a stress level to the number of cycles to failure at that level has a value of 1.0 at the average failure point.

Usually, the relation between $S_A$ and $N(S_A)$ (the S-N curve) is expressed by the following formula:

$$N = C\, S_A^{-m} \qquad \text{Equ. 2}$$

where C and m are material properties for a given temperature, mean stress, and surface condition. Fatigue slope is defined as the factor on stress that would cause a factor of 10 reduction in the number of cycles to failure. The slope relates to the material property m as $$m = 1/\log_{10}(\text{slope}) \qquad \text{Equ. 3}$$

Calculation of fatigue damage requires determination of the amplitude and quantity of all critical stress cycles for all critical areas of the design. Each critical area of the design has life capabilities controlled by its own characteristic material properties.

Field environments can include sine vibration or random vibration and both types of vibration are capable of being evaluated.

Assuming that the random vibration produced by each field service condition or equivalent accelerated test is a stationary Gaussian process or distribution, the total cumulative damage for all field services can be estimated by integrating the Rayleigh probability density function over the response range:

$$p\left(\frac{\zeta_p}{\sigma}\right) = \frac{\zeta_p}{\sigma} e^{-(\zeta_p^2/2\sigma^2)} \qquad \text{Equ. 4}$$

The Rayleigh probability distribution characterizes the distribution of cyclic peak response values.

For random vibration, the number of cycles at each response amplitude is determined by the Rayleigh probability distribution applied to the product of the specific natural frequency and the duration of the vibration. A statistical combination using root sum squared (RSS) of the response levels for multiple frequencies determines the damage experienced at each critical location.

For sine sweep or sine dwell, the transmissibility function determines the response amplitude at an excitation frequency, while the duration at each frequency range times the natural frequency determines the number of cycles experienced.

Due to the exponential relationship of "number of cycles to failure" to stress level, stress cycles at the higher levels dominate the fatigue damage. Couple this with the dynamic amplification of response for excitation frequencies near natural structural modes and fatigue damage is controlled by excitation bands near the natural modes.

T(f) is the stress response function which is established for each critical location. T(f) represents the transmissibility from the input acceleration to the local stress. T(f) is determined in the computer program by performing a detailed finite element stress analysis of each component including inertial loads and forced modal displacements. In any CAE tool use, the accuracy of the prediction of stress level depends on many factors—including the accuracy of numerous material property values and also level of detail in the model required to accurately describe the complex stress distribution. In electronic systems, material properties such as elastic modulus and thermal coefficient of expansion, which are critical to accurate calculation of stress levels, have values that vary widely. Component parts also have large geometric tolerances. Any prediction of life capabilities must allow for the range of values for parameters critical to life. These parameters include geometric features and material properties, cyclic stress distribution including multi-mode response, mean stress, multi-axis loading behavior, residual stress, surface finish and more.

Any analysis that attempts to predict capabilities is limited by the accuracy of the values of all contributing parameters as well as the capability of the mathematical model to represent the complex stress field in the actual structure.

Every assumed property used in the fatigue analysis of electronic systems has an error that effects the accuracy of the prediction. This error is the difference between the actual property value and the value of that property as used in the analysis. The accumulation of all contributing errors in the analysis can be called "life error accumulation factor" (LEAF), Ref. 3.

The one sure method of defining capabilities is testing a product to failure. This defines a product's limits, but detailed analysis is required to define a numerical definition to the product at point-of-failure level. The computer program defines the Life-Usage/Expectations method as the means to obtain these values. The electronic product is then understood at component level.

When predictive calculations are compared to calculations of actual tests to failure, the total level of error is established without a need for defining all the contributing factors. The material property most easily defined for fatigue failure of electronics is the stress exponent "m". The computer method uses a normalized fatigue damage calculation, which performs all the Minor's rule damage for each component with a predefined S-N curve with a stress exponent "m" that is consistent with the failure mode of that component. Comparing the fatigue damage for any test to damage levels that are experienced at failures (known as expectations), the life fraction of any test can be defined. The normalized fatigue damage calculated in the analysis of components tested to failure is, by definition, the numerical value of the LEAF, since the normalized life fraction at failure would have a numerical value of "one" if no error existed in the analysis and all parameters used in the calculation were accurately modeled.

Therefore, the equivalent damage criteria gives:

Damage Life Fraction=[Damage Calculated for Vibration]/[Damage Calculated for Tests to Failure]

The damage calculated for components that have been tested to actual failure define the expectations for the components. Using the simple ratio of 'damage for newly defined design details at design requirements' to the 'damage for tested failures' determines component failure risk. A component that has a Damage Life Fraction equal to or greater than 1.0 is at risk for failure. When a value of one is obtained, the damage experienced by the component is at levels that have resulted in failure in past experience.

Using this ratio removes the inherent error that results from all the contributions of the details of the analysis.

Using a standard component for analysis is just an extension in the use of the LEAF. The calculated life at failure includes a factor on life due to error and unknowns and a factor due to differences in the actual component and the standard component The accuracy of this method is maxized if standard component parameters can be selected to properly represent the dominant stress at the point of failure. The use of standard components allows a numerical definition of vibration quality.

For the Life-Usage/Expectations method, life analysis is performed for all components using standards. The standard component used must include details capable of representing the internal load distribution within the component. For components that are sensitive to modal bending, this includes lead attachment details at ends necessary to create the forces necessary to bend the component to match the mode shape. The 'standard' life usage for all components is compared to expectations of life capabilities for the component type analyzed. The expectations of a component are numerically defined by performing analysis on components that have been tested to failure using the standard component configuration in the analysis model. All test experience can be analyzed, defining a distribution of capabilities for the range of vibration life capability. The lower range of the distribution of failures, excluding defective items, defines the life expectations. When a component life usage falls far below minimum expectations for that component type, that component is a low risk component. When life usage is near or above these minimums, the risk of failure increases. Understanding life capability of the circuit card has two parts:

1) knowing the life usage (based on the standard) for all components,
2) knowing the capability of components relative to expectations (weak, 'expectations' or ruggedized).

When a component life usage exceeds expectations, capabilities should be verified.

Most components are stress dominated by curvature, rather than acceleration; therefore, test measurements provided by accelerometers provide little insight to life capabilities. The method translates test measurements into numerical values meaningful to component vibration life.

The described method is effective for electronic systems due to the combined effects of the modal isolation and the exponential relationship of life capability to stress. The modal isolation creates large separation between the highest stressed components relative to the average. The exponential relationship of life to stress creates an even larger separation in life capability. Therefore a small portion of the design is at risk of failure and this approach efficiently defines risk.

When components are tested to failure, its also desirable to calculate life capabilities of these components using all known parameters in order to better understand the life capability and the reasons for the strength differences between this component and the standard. The program includes capability to evaluate components with parameters representative of standards or of actual design configuration.

OPERATION OF INVENTION

A logic flow diagram for implementing the method in accordance with the present invention on a computer is illustrated in FIG. 1.

A method in accordance with the present invention may be implemented on a general purpose computer. A computer program receives data describing the configuration of the system being analyzed, illustrated generally as in FIG. 1. The data received includes information necessary for performing a modal vibration analysis. This includes dimensional details and material properties. Support method must also be defined. Some of this data may be extracted from CAD data files 90. CAD program files contain layout information such as component names and pin connection locations. An example CAD program is Mentor Graphics Board Station, Mentor Graphics Corp, Wilsonville, Oreg. USA. Computer analysis, 110, of the configuration data results in calculation of the circuit card structural natural frequencies and corresponding mode shapes. Items 110 through 120 could otherwise be accomplished with a general purpose finite element analysis computer program. Based on the displacement mode shapes and the natural frequencies, local inertial loading values can be determined for all components. Structural models of each component analyze the local mode shapes and combine the forced displacement with the inertial forces to determine internal loading associated with the forced modal shapes. The stresses calculated from mode shape and inertial loading combine to define the component stress functions 120. The stress functions developed are peak component leadwire stress per 100 Gs of peak response at each natural response frequency. Component models include configuration details necessary to represent component internal loading distributions. This includes body size and leadwire locations.

Vibration requirements associated with the circuit card are defined 130. The vibration can include a combination of random, sine sweep and sine dwell vibration sets. Fatigue damage calculations are performed using the stress functions 120 for all defined requirements 130. The duration of time at each response level is calculated as defined by the vibration requirements. Using the stress functions 120 and the response distribution, the number of cycles at each response stress level can be determined. Damage is calculated for each component by integrating the life fraction used for each response level using Equation 1. Since computer analysis in a predictive mode is high in error, a means of test correlation for error removal uses normalized fatigue curves for a reduction in the required amount of input detail. These normalized curves use correct fatigue slope as defined in equation 3, with a unified intercept on stress/cycles-to-failure. This is equivalent to using a different value of C in equation 2. Along with differences associated with stress changes due to model approximations or property error, the damage calculated would differ from actual by the differences between the actual C value and the C value described above. Fatigue damage is calculated using these normalized material relationships 150. Similar analysis is performed on actual tests-to-failure or other conditions of experience to establish a numerical definition of expectations of component capabilities (190–200). Calculations are also performed on the test experience with the modified value of C, with the best understanding of values for dimensional and material properties, and with a finite element mathematical model used to represent the circuit card. Damage results from these analyses are used to compare to analysis results from the newly designed configuration. Calculation of a ratio of the results (analysis of new to analysis of test) removes error associated with using the modified C value, as well as removal of all error common to both analyses. In order to maximize the accuracy of the definition of the expectations of capability, actual test data, 140, can be entered into the computer program to analyze the system as tested. Comparison of computer analysis damage results to expectations, 160, defines the design adequacy and determines risk levels for all components. A simple ratio of 'calculated life damage for any newly defined design condition or configuration' to 'calculated life damage from failure tests (expectations)' defines a life fraction for the new design. For the case of environmental stress screening, 170, the damage numbers are compared to damage levels experienced that have been effective for screening equivalent components, thereby defining the effectiveness of the screen for each component. Based on the results, screen vibration profiles can be optimized for effectiveness. For the case of system design, 180, the damage numbers are compared to damage levels experienced that have caused failures in the past or to designs of adequate margin to quantify design margin. The numerical definition of expectations for components is created by performing equivalent analyses of tests of components used in other designs that were life tested, 190–200. The lowest level of calculated damage obtained for components that have failed in tests defines the minimum expectations value. When the damage calculated for a component analyzed for a design condition exceeds this minimum, it is considered to be at risk of failure. These comparisons are made on equivalent normalized damage. Comparison using normalized fatigue damage is an efficient analysis method as well as a means of removal of material property and other computer modeling errors, thereby providing an understanding of the products exposure to vibration at root cause of failure level. If no failure data exists, the damage numbers can be compared to similar products that have had adequate design margins to determine if there are any components that might be considered at risk.

When parts of a design are found to be at risk of failure in this process, the product can be modified to eliminate the root cause of failure. The analysis procedure is repeated on the redesign to determine the change in life capability. This virtual qualification of the product performs analysis on designs that are not built and tested, repeats steps 100–160 and 180 until an adequate design margin exists.

Virtual development of an optimized stress screen process can be performed by repeating steps 130–160 and 170 when only the screen vibration profile is being adjusted or by repeating steps 100–160 and 170 when the screen development process also includes changes that effect the mode shape.

Steady state and cyclic thermal loading of the circuit card, which result through operational loading or environmental exposure of the product, affect the life capability. The rate of fatigue failure is also influenced by mean stress and cyclic loading from other sources of loading. The cyclic loading from thermal loading can be compensated for by a life fraction reduction in the expectations available for vibration damage. There are multiple means within the methods to accommodate thermal stress effects. The thermal stress has steady-state and transient (cyclic) contributions to total stress. Both steady-state and cyclic thermal stress result in a reduction in the expectations number represented by steps 210 and 220. The amount of the reduction can be determined by performing similar analyses on circuit cards that have the same thermal history, simultaneous or past exposure, as the current design being considered. The reduction can also be determined by analysis using life fraction percentage reduction in expectations by the same fraction used as a result of the thermal cyclic loading.

The mean stress effects due to higher or lower stresses from steady-state thermal loading can cause a shift in the value of the expectations. Therefore, data used to establish the expectations for vibration should be developed with comparable conditions. These conditions include steady-state thermal load, cyclic thermal load and expected vibration response distribution shape.

Different types of vibration test machines can be expected to have different shapes of response distributions and can result in different rates of failure. Differences in statistical response distribution shape can be accounted for by a factor on damage, step 230. If comparisons are made between test and analysis, they represent life capability on comparable test equipment.

OTHER REFERENCES

1. Hobbs, G. K. "Highly Accelerated Life Tests—HALT", Hobbs Engineering Corporation, Westminster, Colo. 1990
2. Hobbs, G. K. "Highly Accelerated Stress-Screen—HASS", Hobbs Engineering Corporation, Westminster, Colo. Apr. 14, 1990
3. Starr, J. E. "Understanding Electronic System Vibration Life Capabilities", Proceedings—1999 Military/Aerospace COTS Conference, Aug. 27, 1999

U.S. Class: 73/1.01 field of search 73/1.01,662,808,866

CONCLUSIONS, RAMIFICATIONS AND SCOPE

The primary objective of the present invention is to understand the effects of vibration on electronic products. Electronic products are exposed to vibration as part of normal life cycle conditions. Vibration is also used in qualification and reliability test procedures. Life cycle costs of a product are not limited to the cost of design, development, production and distribution. Costs can be heavily effected by the replacement of warranted product or loss of customer satisfaction when a product is found to be unreliable. Historically, vibration has been found to be very effective for use in the development of reliable electronic products. However, vibration of electronic systems is very complex and test and/or analysis programs have been very expensive.

The "test only" method, tests without supporting analysis fail to provide understanding of life use levels for all components. The "analysis only" method, analyses without test results are at risk due to undefined error level in mathematical modeling. In the current invention, the means of incorporating test results uses the best contribution of two methods for efficient and thorough understanding of product capabilities. Actual accelerometer response measurements are entered into the program input data set. These measurements are analyzed to determine the peak response of the modes of vibration for a more accurate definition of damage levels experienced.

There has always been a hidden disadvantage to "testing only" programs. Test programs only provide hard definition of capability when a failure occurs. Parts near failure provide no hard data. Due to the large expected scatter in capabilities, this may hide a problem that could be critical to the reliability of the product during its projected life. Adding efficient and effective analysis to the test greatly reduces the risk of undiscovered areas of questionable reliability.

The program and methods of this invention are developed for efficient understanding of vibration of electronic systems.

While the best mode of the method has been described in detail, one skilled in this art will be capable of numerous variations, modifications and adaptations without departing from the spirit and scope of the present invention. It should be understood that the present invention is not limited to the processes, embodiments or examples contained herein, but are limited only by the scope of the following claims.

SEQUENCE LISTING

Not applicable

What is claimed is:

1. An application program and method for determining the fatigue life fraction used during vibration testing of an electronic product which includes the application program steps of
   (i) describing the configuration of the electronic product, composed of or containing one or more circuit card assemblies, an assembly being a circuit card board and assembled electronic components;
   (ii) describing the vibration exposure to the electronic assembly representing environmental exposure for either accelerated life profiles and/or environmental screening profiles;
   (iii) a program means for calculating natural response modes of the circuit card, each mode having a natural response frequency and bending mode shape;
   (iv) a program means for calculating the stress functions for each component and response mode shape;
   (v) a program means for calculating the normalized fatigue damage of each component by integrating the ratio of 'the number of experienced cycles of exposure at a stress peak' to 'the number of cycles to failure at that stress peak' over the full response range for all defined vibration requirements;
   (vi) removing computer calculation error by comparing the normalized fatigue damage for all components to the expectations of capability based on component type and component quality;
   (vii) for the case of accelerated life testing using the expectations ratio to determine the adequacy of the design, or for the case of product reliability testing using the expectations ratio to determine the effectiveness of the environmental screen.

2. The application program for vibration life calculation as described in claim 1, further comprising the step of:
   (viii) a program means for entering actual test response levels, measuring the natural bending modes, for a numerically accurate definition of expectations for assembly parts.

3. The application program for vibration life calculation as described in claim 1, further comprising the step of:
   (ix) a program means for defining the expectations of electronic component parts through analysis of actual vibration tests of circuits cards, with and without failures.

4. The application program for vibration life calculation as described in claim 1, further comprising the step of:
   (x) using the normalized fatigue damage method to gain product understanding for the complex field of vibration of electronics hardware.

5. The application program for vibration life calculation as described in claim 1, further comprising the step of:
   (xi) analysis of redesigned product to eliminate the root cause of failures observed in original design.

6. The application program for vibration life calculation as described in claim 1, further comprising the step of:
   (xii) a program means for calculating effects of steady state thermal loading damage of the circuit card.

7. The application program for vibration life calculation as described in claim 1, further comprising the step of:
   (xiii) a program means for life fraction allowance for cyclic thermal loading fatigue damage of the circuit card.

* * * * *